US006685821B2

(12) United States Patent
Kosek et al.

(10) Patent No.: US 6,685,821 B2
(45) Date of Patent: Feb. 3, 2004

(54) METHOD AND SYSTEM FOR PRODUCING HIGH-PRESSURE HYDROGEN (75) Inventors: John A. Kosek, Danvers, MA (US); José Giner, Brookline, MA (US); Anthony B. LaConti, Lynnfield, MA (US)

(73) Assignee: Giner Electrochemical Systems, LLC, Newton, MA (US)

( * ) Notice: Subject to any disclaimer, the term of this patent is extended or adjusted under 35 U.S.C. 154(b) by 134 days.

(21) Appl. No.: 09/942,239

(22) Filed: Aug. 29, 2001

(65) Prior Publication Data

US 2003/0062268 A1 Apr. 3, 2003

(51) Int. Cl.$^7$ .............................. C25B 1/02; C25B 1/00; C25B 9/04; C25B 9/00
(52) U.S. Cl. ..................... 205/637; 205/345; 205/347; 204/256; 204/258; 204/270; 204/230.2
(58) Field of Search ................... 204/253, 254, 204/255, 256, 257, 258, 267, 269, 270, 268, 230.2; 205/338, 345, 347, 637

(56) References Cited

U.S. PATENT DOCUMENTS

| 3,134,696 A | * | 5/1964 | Douglas et al. ............... 429/30 |
| 4,251,334 A | * | 2/1981 | Kircher .................... 204/230.5 |
| 4,279,712 A | * | 7/1981 | Satoh et al. ................. 205/347 |

* cited by examiner

*Primary Examiner*—Patrick Ryan
*Assistant Examiner*—Thomas H. Parsons
(74) *Attorney, Agent, or Firm*—Hale and Dorr LLP (57) ABSTRACT

Disclosed are methods and systems for generating hydrogen gas at pressures high enough to fill a hydrogen storage cylinder for stationary and transportation applications. The hydrogen output of an electrochemical hydrogen gas generating device is integrated with an electrochemical hydrogen compressor operating in a high-differential-pressure mode. The compressor brings the hydrogen produced by the gas generating device to the high pressure required to fill the storage cylinder.

29 Claims, 6 Drawing Sheets

METHOD AND SYSTEM FOR PRODUCING HIGH-PRESSURE HYDROGEN

FIELD OF THE INVENTION

The present invention relates to systems and methods for generating hydrogen, and more particularly to systems and methods for generating hydrogen gas at pressures high enough to fill gas storage cylinders.

BACKGROUND OF THE INVENTION

Hydrogen gas must be generated at high pressures to fill hydrogen storage cylinders for stationary and transportation applications, including on board a vehicle and at refueling stations. To produce hydrogen for use or storage at high pressure, water electrolysis may be performed at the required high pressure, generating both hydrogen and oxygen at high pressure. Alternatively, differential-pressure electrolysis may be employed to generate hydrogen at high pressure and oxygen at substantially atmospheric pressure. To date, high pressure water electrolyzers have been fabricated that either generate both hydrogen and oxygen at 3000 psia, where psia is the pressure in pounds per square inch, absolute, or generate hydrogen at 2500 psia and oxygen at atmospheric pressure. For example, Giner Electrochemical Systems, LLC has fabricated a water electrolyzer that operates at a differential pressure ($H_2 > O_2$) of 2500 psia using plastic materials as frames and proton-exchange membranes (PEMs) as solid-polymer electrolytes. A low-pressure pump provides liquid water at near-ambient pressure to the anode side of the electrolyzer. When DC current is applied, the water is decomposed at the anode to oxygen, protons and electrons. The oxygen is separated from the excess circulating water, which acts as a reactant and coolant, with a low-pressure gas/water separator. All functions on the anode side are conducted at near-ambient pressure. The protons, along with some water, are electrochemically transported across the membrane to the cathode, where they react with the externally transported electrons to produce hydrogen at the required higher operating pressure. The hydrogen is separated from the transported water in a high-pressure gas/water separator.

Electrolyzers operating totally or partially at high pressure may be expensive, involve complex construction, and present safety hazards. Therefore, a need exists in the art for simple, safe, and inexpensive systems and methods for generating hydrogen gas at high pressures.

SUMMARY OF THE INVENTION

The systems of the present invention can generate hydrogen gas at pressures high enough to fill a gas storage cylinder for stationary and transportation applications, including on board a vehicle and at refueling stations. The electrochemical process for generating hydrogen at pressures that may be greater than 3000 psia features feeding the hydrogen output of a water electrolyzer or related electrochemical hydrogen gas generating device operated at atmospheric or moderate pressure to an electrochemical hydrogen compressor operating in a high-differential-pressure mode. "Atmospheric or moderate pressure," as used herein, means from about 0 psia to about 3000 psia. The electrochemical hydrogen compressor has an anode operating at the same pressure as the cathode of the electrochemical hydrogen generator and a cathode operating at the higher pressure required to fill the gas storage cylinder. The compressor, which may be operated at a 3000 psia or greater pressure differential, elevates hydrogen produced by the electrochemical hydrogen generator to the desired high pressure, for example, 6000 psia.

The electrochemical hydrogen generator and compressor of the invention are stacks comprising one or more cells connected electrically in series or in parallel. In some preferred embodiments, each cell contains a membrane and electrode assembly (MEA) comprising an anode and a cathode in intimate contact with and separated by an ionic conductive membrane such as a proton-exchange membrane (PEM) or solid alkaline membrane. When power is applied to each cell in the electrochemical hydrogen generator stack, protons and electrons are generated at the anode. The protons are electrochemically transported across the membrane to the cathode, where they combine with the externally transported electrons to form hydrogen gas. This hydrogen gas is fed to the hydrogen compressor, where it is oxidized at the anode of each cell to form protons and electrons. The protons are transported across the membrane to the cathode, where they are reduced by the externally transported electrons to form hydrogen at the desired higher pressure.

The anticipated benefits of the invention include safety of operation and relative simplicity of constructing a differential-pressure hydrogen compressor cell compared to an electrolyzer with the same pressure difference, which translates into cost savings. The two-cell system of the invention is safer to operate than a high-pressure electrolyzer. Membrane failure in the compressor cell presents little hazard as long as there is a pressure shut off valve, and membrane failure in the low-pressure electrolyzer is less dangerous than it would be in a high-pressure electrolyzer. Thus, the two-cell system allows for the use of thinner membranes, resulting in lower voltage. This compensates for the somewhat higher overall voltage and power inefficiency anticipated when using two cells instead of one. In addition, less risk of explosion exists in recirculating water accumulated at the anode or cathode side of the compressor to the low-pressure electrolyzer of the two-cell system than in feeding a pressurized reactor with cathode water, even if the water contains some hydrogen.

A water electrolyzer alone could be used to generate hydrogen at high pressure; however, above 2500 psia differential pressure, difficulties arise in supporting the MEA as mechanical properties of the membrane, metallic support structures and compression pads rapidly deteriorate. A high-pressure PEM electrolyzer is also more expensive than an integrated low-pressure electrolyzer and electrochemical hydrogen compressor. Low-cost materials that may be used in the compressor, but not in the high-pressure electrolyzer, include carbon-supported electrode structures, stainless steels, inconels, hastelloys, low-cost hydrocarbon PEMs, and anion exchange (hydroxide transport) membranes. In the compressor, carbon, graphite, hastelloys, stainless, and inconels may replace the costly valve metals (Ti, Zr, Nb) used in electrolyzers. In addition, small noble metal loadings are required due to the high reversibility of the hydrogen electrode in the absence of carbon monoxide and other inhibiting gas traces.

Further, the sizable power efficiency losses associated with operating a pressurized hydrogen cathode are an order of magnitude smaller in hydrogen compressor cells than in a high-pressure (or high-pressure-differential) water electrolyzer, because the cell voltage is an order of magnitude lower. Operating the electrolyzer at near atmospheric pressure also allows for the use of lower current densities at the electrolyzer stack without a substantial decrease in faradaic efficiency, which is close to 100%. Decreased current density may be achieved by distributing approximately the same amount of electro-catalyst over a larger membrane surface, resulting in higher voltage efficiency of the electrolyzer. These advantages more than compensate for the additional voltage required by the hydrogen compressor cell (which may contribute 5 to 10% to the overall system voltage compared to single cell voltage) and the existence of two cells versus one.

These and other benefits and features of the present invention will be more fully understood from the following detailed description, which should be read in light of the accompanying drawings.

DETAILED DESCRIPTION OF THE PREFERRED EMBODIMENTS

Figure 1:
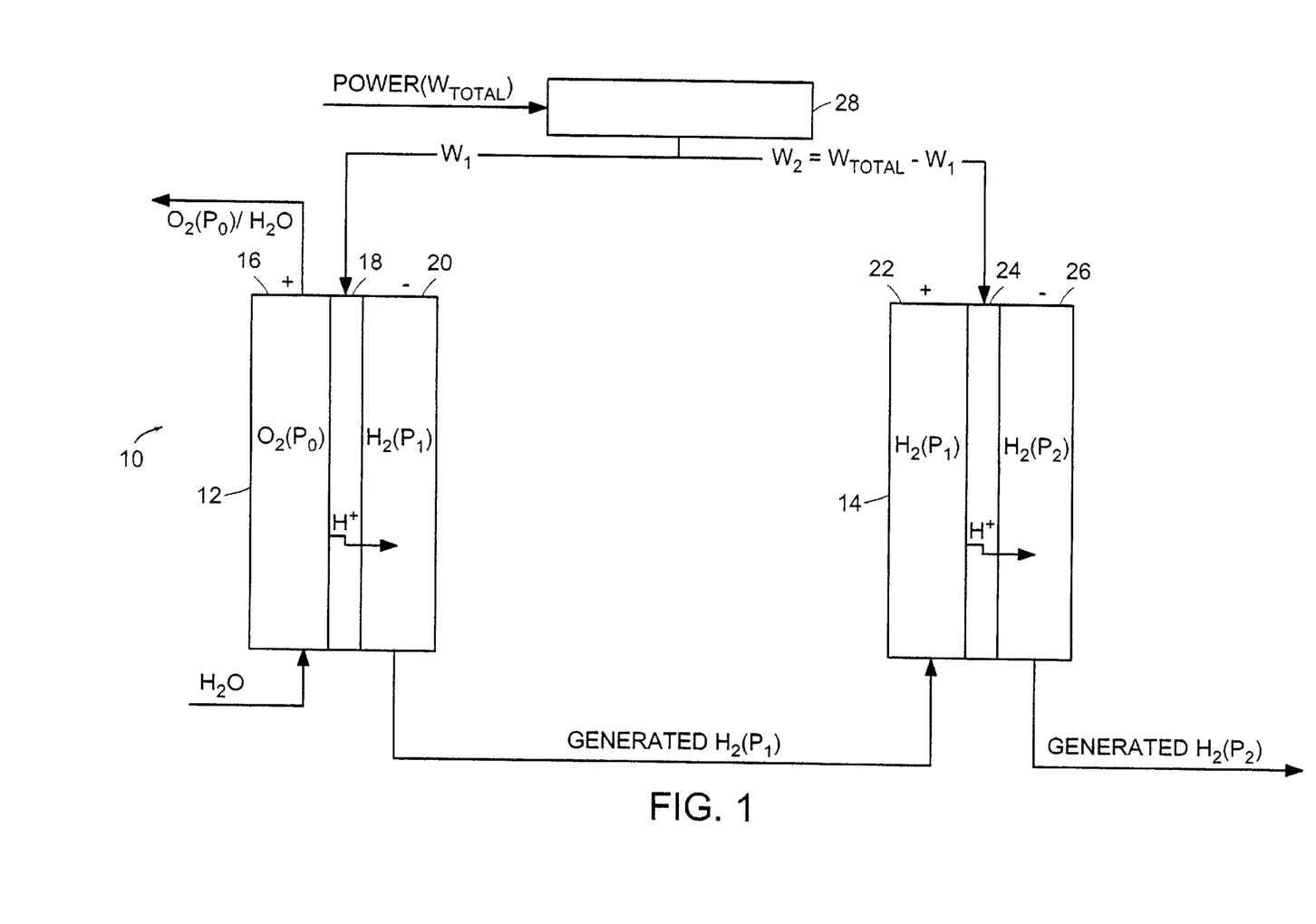
FIG. 1 is a schematic diagram of an integrated electrolyzer stack and electrochemical hydrogen compressor stack.

Referring to FIG. 1, a system 10 of the present invention is shown, comprising an integrated electrochemical hydrogen generating stack 12 and electrochemical hydrogen compressor stack 14. In the embodiment of FIG. 1, the electrochemical hydrogen generating stack 12 is a water electrolysis stack comprising an anode 16. At the anode 16, water is used as a reactant and oxygen is generated at a near-ambient pressure $P_0$. The operable range for $P_0$ is from about 0 psia to about 2,500 psia, with a preferred range of from about 0 psia to about 200 psia, where a low pressure pump could be used. Protons formed at the anode 16 are electrochemically driven across a membrane and electrode assembly (MEA) 18 to a cathode 20 where they combine with externally driven electrons to form hydrogen at an elevated pressure $P_1$, which is greater than $P_0$. The operable range for $P_1$ is from about 30 psia to about 3,000 psia, with a preferred range of from about 500 psia to about 2,500 psia. The generated moist hydrogen from the electrolyzer is fed to an anode 22 of the electrochemical hydrogen compressor stack 14, where it is oxidized to form protons. The protons are electrochemically driven across an MEA 24 to a cathode 26, where they combine with externally driven electrons to form hydrogen at a high pressure $P_2$, which is greater than $P_1$. The operable range for $P_2$ is from about 500 psia to about 10,000 psia, with a preferred range of from about 2,500 psia to about 5,000 psia. The electrode reactions are as follows, where $P_0 < P_1 < P_2$:

| | | |
|---|---|---|
| $H_2O \rightarrow 1/2 O_2 (P_0) + 2H^+ + 2e^-$ | @ electrolyzer anode | [1] |
| $2H^+ + 2e^- \rightarrow H_2 (P_1)$ | @ electrolyzer cathode | [2] |
| $H_2O \rightarrow 1/2 O_2 (P_0) + H_2 (P_1)$ | Electrolyzer net reaction | [3] |
| $H_2 (P_1) \rightarrow 2H^+ + 2e^-$ | @ compressor anode | [4] |
| $2H^+ + 2e^- \rightarrow H_2 (P_2)$ | @ compressor cathode | [5] |
| $H_2 (P_1) \rightarrow H_2 (P_2)$ | Compressor net reaction | [6] |

A power conditioner 28 provides the power required for electrochemical hydrogen generation and compression. The power supplied to the compressor 14 is equal to the difference between the total power of the power conditioner 28 and the power supplied to the electrolyzer 12.

Figure 2:
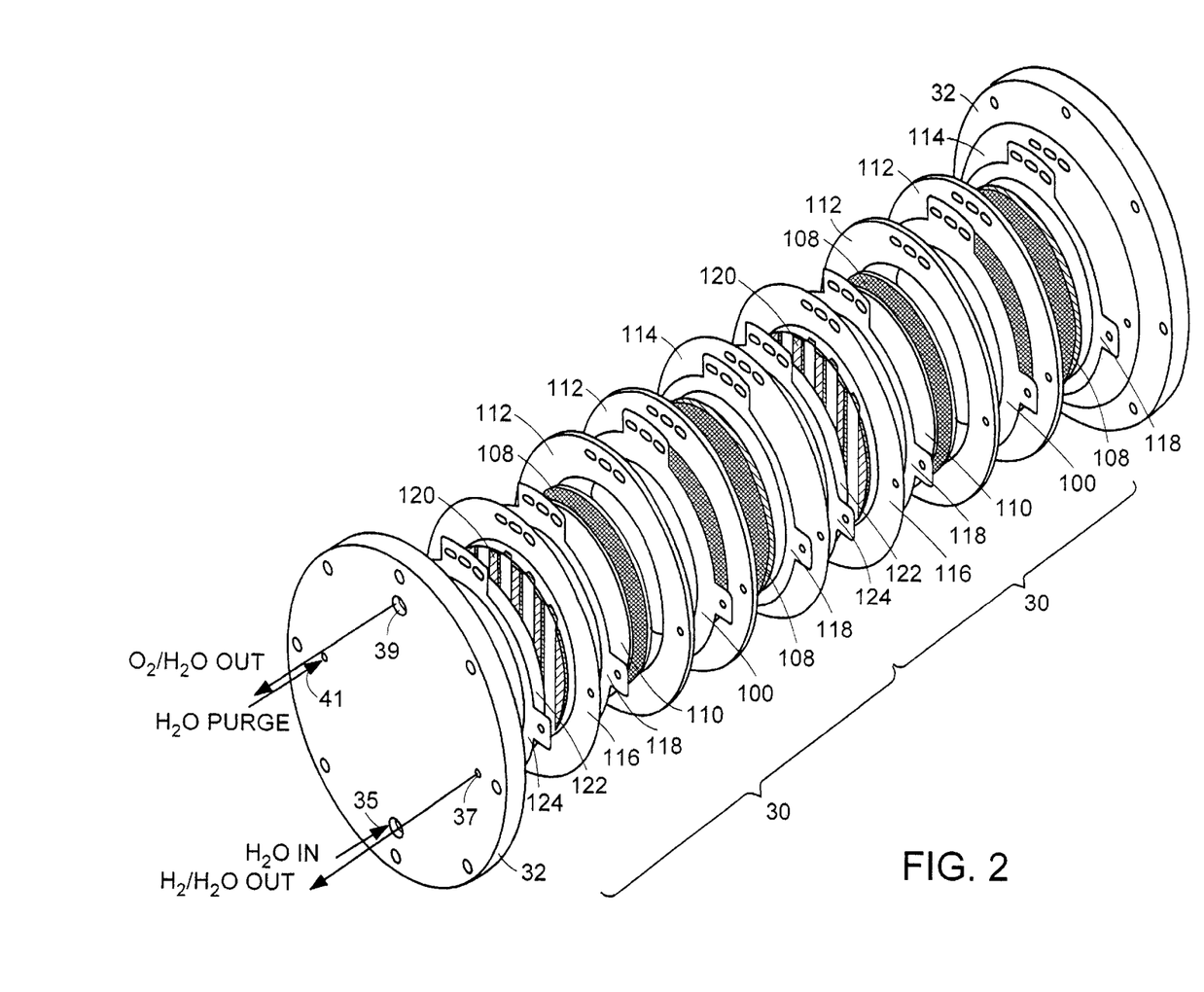
FIG. 2 is a perspective view of an electrolyzer stack.
Figure 5:
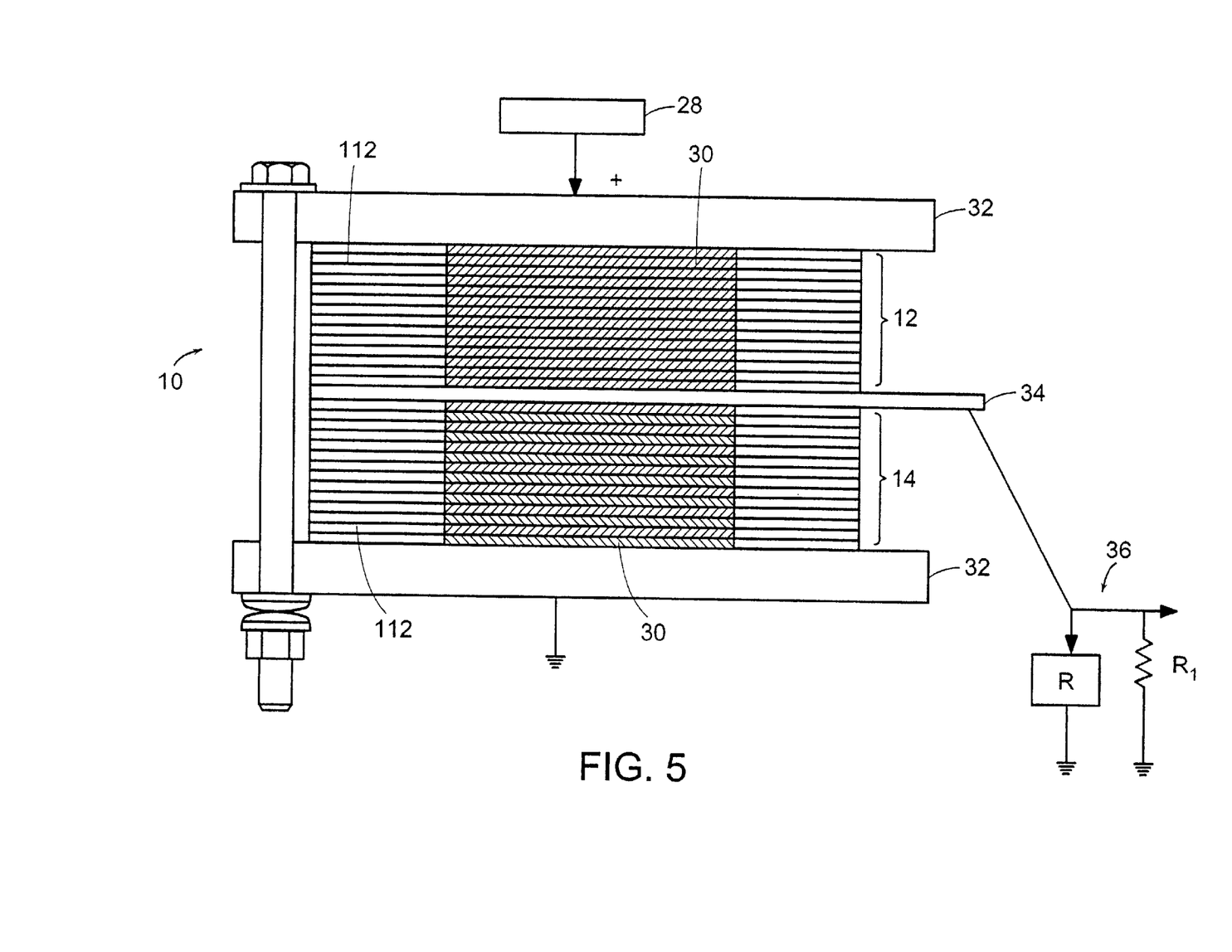
FIG. 5 is a schematic diagram of an integrated and unitized electrolyzer stack and hydrogen compressor stack.

The electrochemical hydrogen generating stack 12 and hydrogen compressor stack 14 comprise one or more cells 30 connected electrically in series, as shown in FIG. 5. In some alternative embodiments, the cells 30 may be connected in parallel. FIG. 2 shows a perspective view of a typical water electrolyzer stack 12. The cells 30 are held between a set of end plates 32. Water enters the stack 12 through an opening 35. Product humidified hydrogen leaves the stack 12 through an opening 37. Product oxygen and water leave the stack 12 through an opening 39. A water purge opening 41 may be used to remove hydrogen from the cells 30 and manifolds during extended periods (days) of shutdown. A typical hydrogen compressor stack 14 has a similar configuration to the electrolyzer stack 12.

Figure 3:
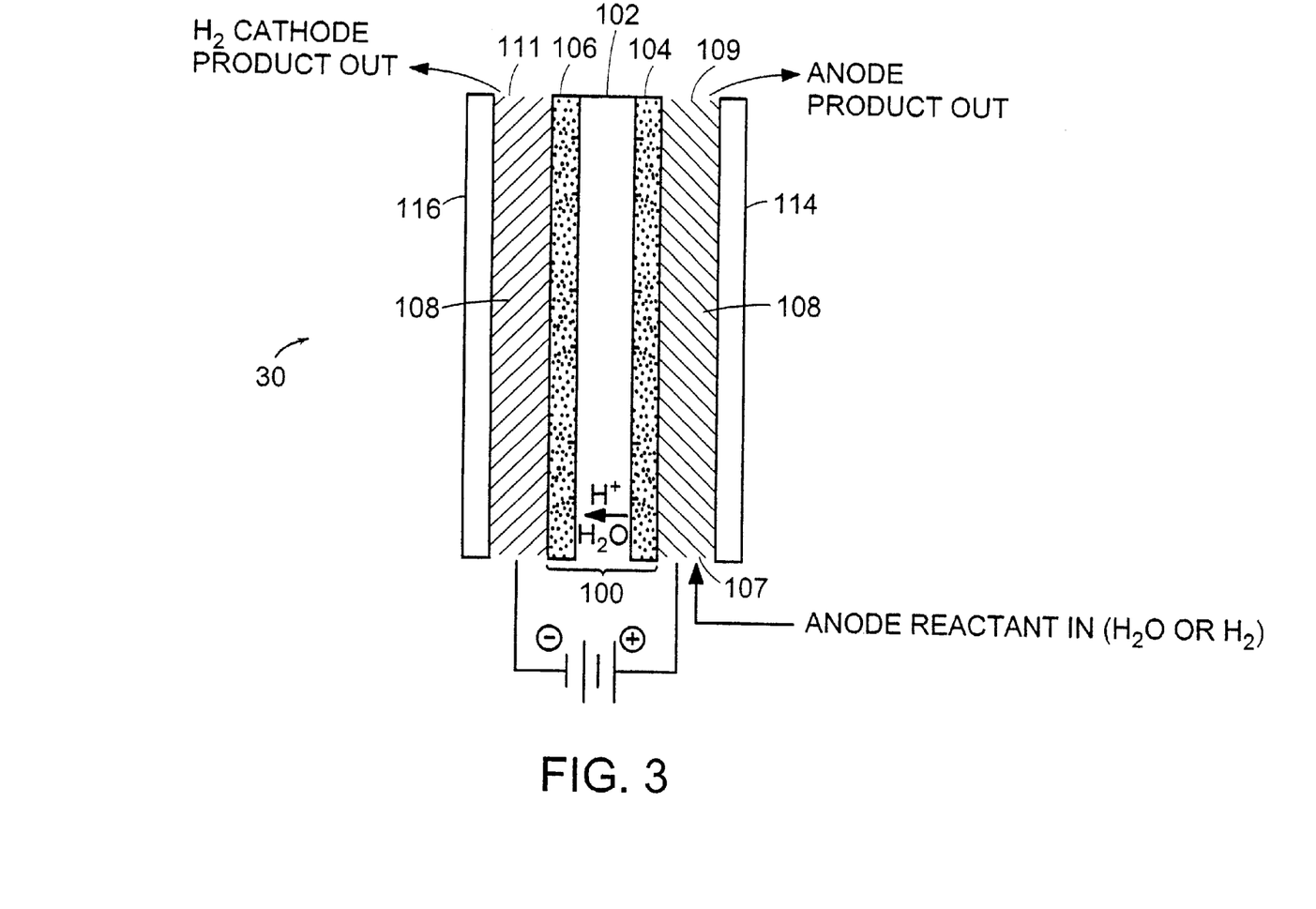
FIG. 3 is a cross-sectional view of a single water electrolysis cell or electrochemical compressor cell.

FIG. 3 shows a cross-sectional view of a typical single cell 30, with substantially the same configuration for the electrolyzer cell 30 as for the compressor cell 30. The cell 30 may have an active cell area of from about 5 $cm^2$ to about 1 $M^2$ per cell, with a preferred active cell area of from about 50 $cm^2$ to about 1000 $cm^2$. The cell 30 includes an MEA 100 comprising an ionic conductive membrane such as a thin proton-exchange membrane (PEM) 102 to which an anode 104 and a cathode 106 are attached. The ionic conductive membrane of the MEA 100 may be, for example, perfluorocarbon sulfonic acid sold under the trade name Nafion (DuPont, Wilmington, Del.) for PEM electrolyzers or compressors; sulfonated grafted polystyrene-TFE based materials such as R-4010 sold by RAI (Hauppauge, N.Y.) for PEM hydrogen compressors; and grafted, quaternary ammonium hydroxide polystyrene-TFE based materials such as R-4030 sold by RAI (Hauppauge, N.Y.) for alkaline hydrogen compressors. The ionic conductive membrane of the MEA 100 may have a thickness of from about 18 micrometers to about 200 micrometers, with a preferred thickness of from about 25 micrometers to about 100 micrometers. The electrodes of the MEA 100 may be, for example, of the types disclosed in U.S. Pat. Nos. 3,992,271; 4,039,409; and 4,311,569, the teachings of which are incorporated herein by reference. The electrodes of the MEA 100 may have noble metal (N.M.) catalyst loadings of from about 0.05 mg N.M./$cm^2$ to about 8 mg N.M./$cm^2$, with preferred N.M. catalyst loadings ranging from about 0.1 mg N.M./ $cm^2$ to about 0.8 mg N.M./ $cm^2$. Suitable noble metal catalysts include, for example, Pt, Ir, Ru, Pd, Rh, Re, Os, and their oxides. Such catalysts are especially preferred for PEM embodiments. In some alternative embodiments, the electrodes of the MEA 100 may include non-noble metal catalysts and their oxides, for example, Ni, Ag, Co, Fe, and La, used in combination with one another and also supported on high surface area catalyst supports such as carbons, graphites, carbides, nitrides, valve metal oxides and transition metal oxides. Such catalysts are especially preferred for alkaline embodiments of the invention.

Expanded metal distributor screens 108 on each side of the MEA 100 conduct current and improve the flow distribution of gas and liquid products and reactants through the cell 30. Suitable materials for current collectors and fluid, electric current distributors of the invention include, for example, valve metals, transition metals, carbons, graphites, carbides, and composites thereof with polymers such as Kynar (Elf Atochem, Philadelphia, Pa.) and polysulfone. Preferred materials include Ti for PEM electrolyzer anodes; graphite, Zr, and carbon for PEM electrolyzer cathodes; and graphite, carbon, stainless, hastalloys, and inconels for PEM hydrogen compressors and alkaline systems applications. The metal screens 108 mechanically support the MEA 100, which can easily withstand differential pressures ($H_2>O_2$) in excess of 2500 psia. Separators 114, 116 contain fluids on the face of the screens 108 or active area of the cell assembly.

The reactants, water in a water electrolyzer cell 30 and hydrogen in a hydrogen compressor cell 30, enter the cell 30 through an opening 107 on the anode side. The reactants flowing along the screen 108 on the anode side contact the anode 104, where protons and electrons are produced. In a water electrolyzer cell 30, oxygen is also produced at the anode 104. The oxygen flows along the screen 108 and leaves the cell 30, along with excess water, through an opening 109 on the anode side, at the opposite end of the cell 30 from the opening 107 through which water enters the cell 30. Protons produced at the anode 104 are electrochemically transported across the PEM 102 to the cathode 106, where they combine with the externally transported electrons, which flow from anode 104 (loss of electrons) to cathode 106 (gain of electrons), to form hydrogen gas at an elevated pressure relative to the anode-side gas. Hydrogen gas produced at the cathode 106 flows along the screen 108 and leaves the cell 30 through an opening 111 on the cathode side.

Figure 4:
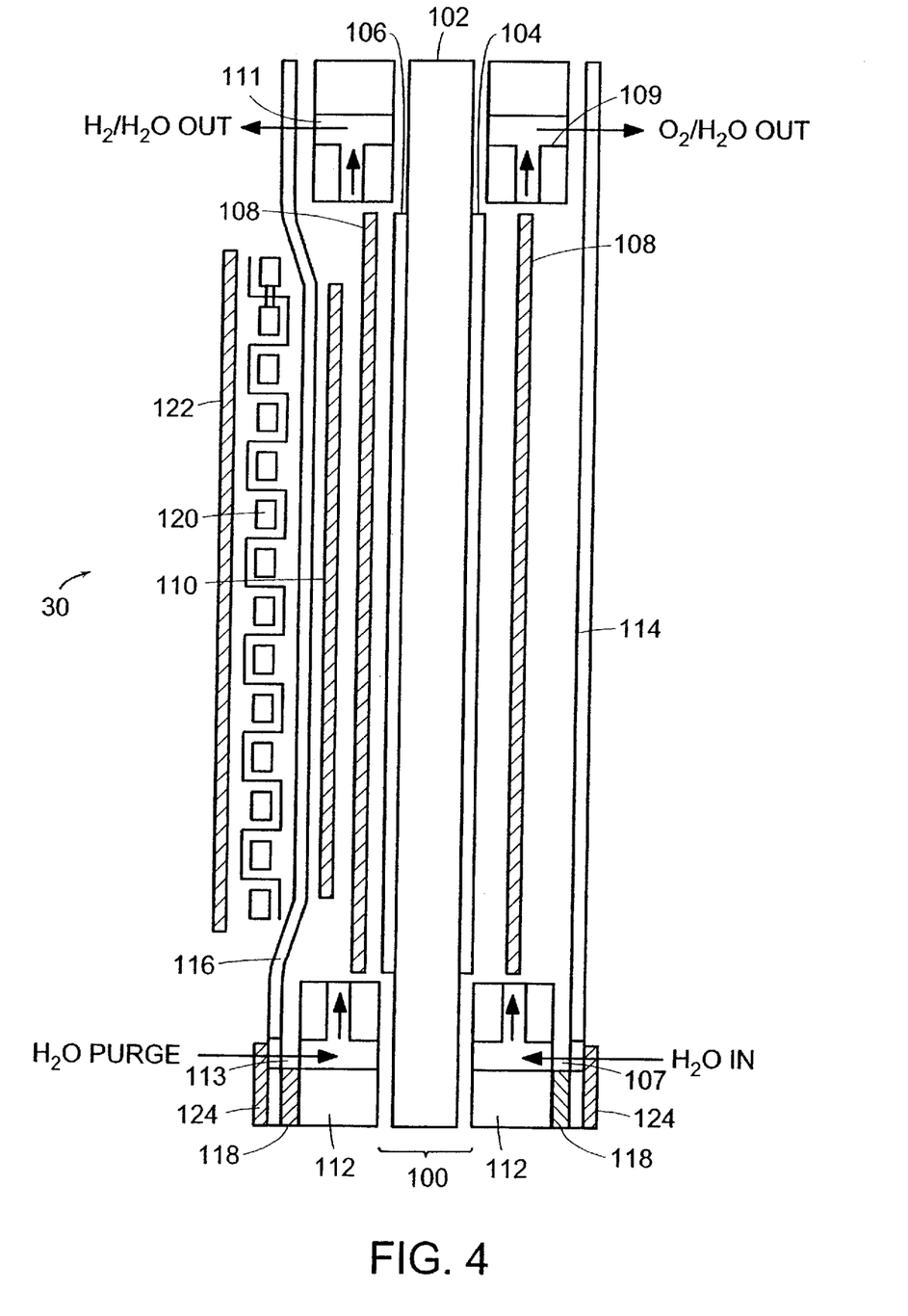
FIG. 4 is a cross-sectional view of a water electrolysis cell.

FIG. 4 depicts a typical single water electrolysis cell 30 (see also FIG. 2). The MEA 100 is contacted on each side by metal screen 108 comprising a multi-layer screen package. The screen package is preferably about 0.03 inches thick and may be, for example, of the type disclosed in U.S. Pat. No. 6,179,986, the teachings of which are incorporated herein by reference. For example, the screen package may be an integral lightly platinized (0.2 mg/cm$^2$) Ti current collector/water distribution mesh package fabricated by spot welding two or more expanded meshes, sold by Exmet Corp. of Naugatuck, Conn. under the trade name Exmet, until the total mesh thickness is equivalent to the thickness of cell frame 112. Alternatively, the screen package may be a grooved carbon current collector/water distribution structure made of materials such as porous C, solid C, or molded C or TiC composites with polymers such as Kynar (Elf Atochem, Philadelphia, Pa.) or polysulfone.

The screens 108 form fluid cavities for the water, hydrogen, and oxygen. Behind each screen 108 on the cathode side is an insert 110, which, along with oxygen separator 114 and hydrogen separator 116, contains the fluids on the face of the screens 108 or active area of the cell assembly. The insert 110 may be a solid foil, a porous foil, a mesh, or a combination thereof, with a total thickness ranging from about 0.01 cm to about 0.15 cm, preferably from about 0.025 cm to about 0.075 cm. Suitable materials for the insert 110 include, for example, metals such as Ti and Nb, stainless, and carbon. The separators 114, 116 may, for example, comprise thin composite, conductive plates made of materials such as Nb or Ti foil on the anode side and Zr foil or molded carbon on the cathode side. In some embodiments, the separators 114, 116 may be of the types described in U.S. Pat. Nos. 6,179,986, 4,214,969 and 4,339,322, the teachings of which are incorporated herein by reference.

Each screen 108 is surrounded by a cell frame 112, made of polysulfone or another material with similar properties, that externally contains the fluids and manifold or ports that direct fluids in and out of the screen cavities. Suitable materials for the cell frame 112 include, for example, organic and inorganic polymers or plastics, carbons, graphites, composites of carbons or graphites with polymers, ceramics and electrically inerted or coated metals. The cell frame may have a total thickness of from about 0.05 cm to about 0.5 cm, with a preferred thickness of from about 0.15 cm to about 0.3 cm. Liquid water, preferably distilled or deionized, enters the cell 30 through an opening 107 in the frame 112 on the anode side and flows along the screen 108. The water is uniformly distributed along the screen 108 and is oxidized along the anode 104 of the MEA 100 to form oxygen, protons, and electrons. The oxygen and some water are released from the cell 30 through an opening 109 in the frame 112 on the anode side, at the opposite end of the cell 30 from the opening 107 through which water enters the cell 30. The protons and some water are transported across the PEM 102 to the cathode side of the cell 30. The protons are reduced along the cathode 106 by externally transported electrons to form humidified hydrogen, which is released from the cell 30 through an opening 111 in the cathode side of the frame 112. This process is repeated for any additional cells 30 in the electrolyzer stack 12, and the humidified product hydrogen is fed to the hydrogen compressor stack 14. A water purge opening 113 in the cathode side of the frame 112 may be used to remove hydrogen from the cells 30 and manifolds during extended periods (days) of shutdown.

The screens 108 also serve as current collectors, conducting electrons from the cell anode 104 to the oxygen separator sheet 114, from which they pass through the adjacent hydrogen separator 116 and screen package 108 to the cathode 106 of the next cell in a bipolar configuration. Gaskets 118, preferably 0.005-inch-thick plastic, seal the cell frame 112 to the metal separators 114, 116, while the membrane 102 seals the frame 112 on the opposite side. A pressure pad assembly 120, for example made of silicone and woven metal strips, and breather screen 122 between two adjacent hydrogen and oxygen metal separators 114, 116 provide the contact pressure against the cell active area through the separators 114, 116. A plastic manifold gasket 124 surrounds the pressure pad assembly 120 between the separators 114, 116 to seal the fluid manifold parts between cells 30 in the stack 12.

The mechanical design configuration for a typical hydrogen compressor cell 30 of the invention is similar to that of the water electrolysis cell 30 shown in FIG. 4, except that humidified hydrogen gas is introduced to the anode side of the cell 30 instead of liquid water, so hydrogen is oxidized to protons and electrons but no oxygen is produced. The hydrogen-generating reaction at the cathode side is the same for the compressor as for the electrolyzer, the reduction of protons with electrons to form hydrogen, and hydrogen may be generated at 2500 psia above the anode side. The concept of a PEM hydrogen concentrator/compressor is described by Sedlak et al., Int. J. Hydrogen Energy 6:45–51 (1981), the teachings of which are incorporated herein by reference.

FIG. 5 shows an example of a preferred system 10 of the invention, comprising an integrated electrochemical hydrogen generating stack 12 and electrochemical hydrogen compressor stack 14, and a power conditioner 28. The electrochemical hydrogen generating stack 12 is a 2-inch high water electrolyzer stack composed of 14 cells 30 in electrical series, each with 0.05 ft$^2$ (3-inch diameter) of active area. The stack 12 generates oxygen at between about 40 psia and about 200 psia and hydrogen at about 1000 psia. The stack 12 runs at 15.5 amps (310 mA/cm$^2$) at 1.58 volts per cell. The cell voltage and diffusional losses of 0.5 amps result in a stack efficiency of slightly above 90% on the basis of the higher heating value of hydrogen, with 37 Watts of waste heat. The electrochemical hydrogen compressor stack 14 comprises cells 30 of similar number and size to those of the electrolyzer stack 12, in electrical series with one another, and in parallel with the electrolyzer stack 12. The compressor elevates hydrogen from about 1,000 psia to about 5,000 psia. The electrolyzer and electrochemical compressor stacks 12, 14 are unitized and held between a single set of 6-inch diameter end plates 32 to minimize weight, volume and cost. Polysulfone cell frames 112 of 4.5-inch diameter with ridges and containment rings surround the cells 30 in each stack 12, 14. An electrical bus 34 separates the stacks 12, 14 and allows them to be operated at different currents as required by their different production rates. A control circuit 36 controls the voltage across the electrochemical hydrogen compressor 14 at the required 0.05 to 0.1 volt/cell. If the hydrogen feed stream to the electrochemical hydrogen compressor 14 is interrupted, causing the voltage to rise, the current of 15.5 amps is shunted around the compressor 14 to prevent the voltage from rising to the point where oxygen would be generated on the anode side of the compressor 14.

The equation for the thermodynamic voltage of the electrochemical hydrogen compressor cell of the invention is as follows, if the anode is fed at 30 psia (~2 Atm, a, where Atm, a is the pressure in atmospheres, absolute):

$$E = 29.5 \frac{T}{298} \log \frac{P}{P_{atm}}, \text{mV} \quad [7]$$

At 100° C. (373°K) and 3000 psia (~200 Atm, a) pressure differential, E=74 mV. The thermodynamic voltage required by the hydrogen compressor cell is equal to the additional thermodynamic voltage of a differential-pressure electrolyzer with a cathode operating at the same high pressure over the potential of an all-atmospheric-pressure electrolyzer, i.e., there is no difference in thermodynamic voltage attributable to the high-pressure cathode in the two approaches. However, the hydrogen compressor cell contributes to overall voltage through an additional polarization due to current multiplied by ionic resistance and very slight activation overvoltages. Operable voltages for electrolyzers of the invention range from about 1.4 V to about 3.0 V, with a preferred range of from about 1.5 V to about 2.0 V. Operable voltages for hydrogen compressors of the invention range from about 0 V to about 0.5 V, with a preferred range of from about 0.05 V to about 0.30 V. Operable current densities for electrolyzers and electrochemical compressors of the invention range from about 0 mA/cm$^2$ to about 3,000 mA/cm$^2$, with a preferred range of from about 300 mA/cm$^2$ to about 2,000 mA/cm$^2$.

A consequence of high-pressure hydrogen cathode operation is permeation of hydrogen through the PEM, which significantly reduces faradaic efficiency. This applies for both a high-pressure electrolyzer and a high-differential-pressure hydrogen compressor, but an electrolyzer with pressurized anode and cathode has significant additional inefficiency due to oxygen permeation. A much smaller oxygen permeation inefficiency exists when the anode operates at low pressure. The faradaic inefficiency effects a power efficiency loss, which is about 10 times higher for a high-pressure electrolyzer than for a high-differential-pressure hydrogen compressor because the cell voltage of the electrolyzer is about ten times higher.

In a system with electrolyzer and compressor stacks connected electrically in series and having the same number of cells, the hydrogen migration from high-pressure cathode to low-pressure anode in the compressor stack would create a continuous pressure buildup in the low-pressure hydrogen space, the gas space of the compressor anode, the electrolyzer cathode, and the associated plumbing. If the number of cells in each stack is sufficiently large, pressure balance in the low-pressure hydrogen space may be achieved by using one or more additional cells in the electrochemical compressor stack than in the electrolyzer stack. The number of additional cells in the compressor stack will depend on total cell number, cell characteristics, and operating pressures. As demonstrated in Example 3 herein, a typical system of the invention may comprise 15 cells per stack, requiring one additional cell in the electrochemical compressor stack. This solution does not lend it self to a perfect match due to the stepwise introduction of additional cells.

Alternatively, or to fine-tune a design with a slightly larger electrochemical compressor stack than electrolyzer stack, an additional power source may be connected between the terminals of the electrochemical compressor (low voltage) stack. Other alternative or additional measures include shunting the electrolyzer (high voltage) stack by a resistor or periodically venting hydrogen pressure. The latter two approaches are recommended only if the unbalance is small, such that the lost power or hydrogen represents a small fraction of the supplied power or pressurized hydrogen. Low pressure in the hydrogen space, for example due to over-correction in selecting the number of cells by which the electrochemical compressor stack exceeds the electrolyzer stack, may be remedied by shunting the hydrogen compressor (low voltage) stack by a resistor or by connecting an additional power source between the terminals of the electrolyzer (high voltage) stack.

Those of skill in the art will appreciate that adding water to a low-pressure electrolyzer is relatively straightforward and routinely practiced. Net water addition is not required in the hydrogen compressor cells, but humidification of anode hydrogen is usually necessary in PEM cells since the transported proton is hydrated. Hydrogen produced by the electrolyzer is humidified, and the humidity can be regulated by controlling the temperature of the electrolyzer or the hydrogen gas. The moderate pressure and the temperature of the electrolyzer is selected to produce optimal electrochemical PEM hydrogen compressor anode operation, especially with respect to humidity. In addition to requiring two stacks, the systems of the present invention require a gas-diffusion electrode, which is the anode of the hydrogen compressor cells. However, this electrode is straightforward to operate, especially since the hydrogen gas from the electrolyzer is humidified at saturation and the electrolyzer temperature may be controlled to create ideal humidification for the hydrogen compressor cell. The operational temperature ranges for the system are from about 25° C. to about 130° C., with a preferred temperature range of from about 25° C. to about 80° C. The operating pressure of the system ranges from about 0 psia to about 10,000 psia, with a preferred pressure range of from about 30 psia to about 5,000 psia. Net removal of water from the cells at the high- or low-pressure end is reasonably straightforward.

As shown in the figures and demonstrated in the examples below, the electrochemical hydrogen generating stack of the invention may be a PEM water electrolyzer stack. However, the electrochemical hydrogen generating stack may be any ionic conductive membrane electrochemical stack operating at atmospheric or moderate pressure to produce protons and electrons at the anode by oxidation and generate hydrogen gas at an elevated pressure at the cathode by electrochemical reduction of the protons with the electrons. Alternative electrochemical hydrogen generating stacks of the invention include cells that generate hydrogen gas at the cathode and also produce protons at the anode and/or hydroxide ions at the cathode. For example, an alkaline liquid electrolyzer that generates hydroxide ions as well as hydrogen at the cathode may be used, as long as precautions are taken to eliminate any NaOH entrapped in the low-pressure hydrogen stream from the integral electrochemical compressor. In some embodiments, sodium sulfate electrolyzers may be used, wherein sulfuric acid (from protons) and oxygen gas are generated at the anode, and sodium hydroxide (from hydroxide ions) and hydrogen are produced at the cathode. In other alternative embodiments, electrolyzers of the invention include brine, chloralkali electrolyzers, which generate chlorine at the anode and hydrogen gas and hydroxide ions at the cathode, and HCl or HBr electrolyzers, which generate chlorine or bromine, respectively, and protons at the anode and hydrogen gas at the cathode. In still other alternative embodiments of the invention, a methanol/hydrogen stack may be used, in which methanol is oxidized at the anode to produce protons, electrons and carbon dioxide, and hydrogen gas is evolved at an elevated pressure at the cathode by reduction of the protons with the electrons. In still other embodiments, the electrochemical hydrogen generating stack is a reformate/hydrogen stack, in which the reformate gas contains hydrogen gas diluted with carbon dioxide, nitrogen, and water vapor. The diluted hydrogen gas is oxidized at the anode to form protons and electrons, and pure hydrogen gas at an elevated pressure is produced at the cathode from the reduction of the protons and electrons.

As shown in the figures and examples herein, the electrochemical hydrogen compressor stack of the invention may be a PEM hydrogen compressor. In some alternative embodiments of the invention, the electrochemical hydrogen compressor may be a solid alkaline membrane electrochemical hydrogen compressor. An example of a solid alkaline membrane is RAI 4030, supplied by RAI, Hauppauge, N.Y., a fluorocarbon-grafted quaternary ammonium hydroxide anion exchange membrane. A solid alkaline membrane generally is not sufficiently stable for use in electrolyzers or fuel cells where hydrogen and oxygen are present, but stability is significantly enhanced in an electrochemical hydrogen compressor where only a hydrogen atmosphere is present.

The following nonlimiting examples further illustrate certain preferred embodiments of the present invention:

EXAMPLE 1

Figure 6:
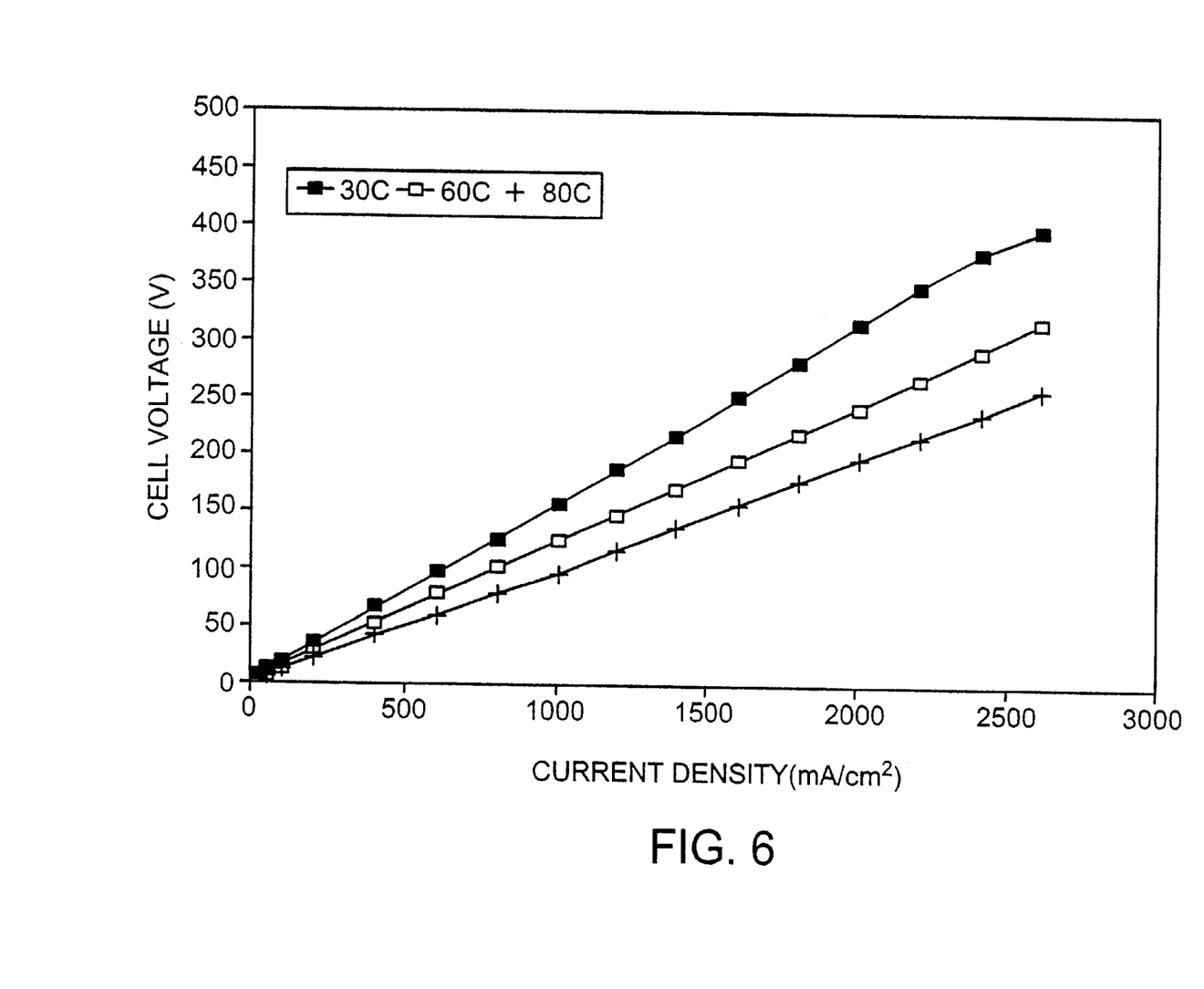
FIG. 6 is a graph showing the performance of the electrochemical compressor described in Example 1 at various temperatures.

A hydrogen compressor cell 30 with active cell area of 0.05 ft$^2$ was assembled with a 5-mil (dry) membrane 102 (Dow Chemical, Midland, Mich., Dow XUS 13204), having an equivalent weight of approximately 800 and an ion-exchange capacity (meq of H$^+$ ion/g of dry polymer) of 1.25. Pt black electrode structures 104, 106 were integrally bonded to each surface of the membrane 102. Ambient-pressure hydrogen was fed to the anode 104 of the PEM compressor cell 30, where it was continually oxidized to form protons, which were electrochemically transported across the membrane 102 to the cathode 106. At the cathode 106, the protons were reduced back to hydrogen, which was allowed to rise to a higher pressure. Because the hydrogen oxidation and reduction reactions are highly reversible, essentially all of the voltage losses were due to current multiplied by ionic resistance. The hydrogen gas was compressed from approximately 15 psia to approximately 30 psia. The performance of the electrochemical compressor 14 at 30° C., 60° C., and 80° C. is shown in FIG. 6.

EXAMPLE 2

A hydrogen compressor cell 30 with an active cell area of 0.23 ft$^2$ was assembled with 10-mil (dry) Nafion 120 membrane 102 (E.I. DuPont, Wilmington, Del.) and successfully operated at 1000 mA/cm$^2$, compressing hydrogen gas from approximately 15 psia to approximately 1000 psia. Cell voltage was approximately 0.32 V at 40° C.

EXAMPLE 3

A compressor stack 14 with a 15-mil Nafion membrane 102 (E.I. DuPont, Wilmington, Del.), having a water content of 0.37 g of water per 1 g of dry membrane operates at a differential pressure of 3000 psia (~200 Atm, a). The compressor stack 14 is integrated with an electrolyzer stack 12 with the same number of cells 30 operating at 80° C. and near-atmospheric pressure, with a current density of 1000 mA/cm$^2$. The hydrogen lost from the high-pressure to the low-pressure side of the compressor stack 14 is 6.7% of the total hydrogen generated; the electrolyzer 12 has a negligible effect on the amount of hydrogen transferred to the low-pressure hydrogen space. The 6.7% hydrogen loss is offset by adding 1 cell per every 15 cells of a theoretical (no hydrogen permeability) compressor stack 14 while leaving the electrolyzer stack 12 untouched.

While the foregoing invention has been described with reference to its preferred embodiments, various alterations and modifications will occur to those skilled in the art. All such alterations and modifications are intended to fall within the scope of the invention and the appended claims.

What is claimed is:

1. A system for producing high-pressure hydrogen, comprising:
   (a) a first stack of at least one electrochemical hydrogen generating cell for generating hydrogen at a first pressure, said electrochemical hydrogen generating cell including a first anode and a first cathode; and
   (b) integrated with said first stack, a second stack of at least one electrochemical hydrogen compressor cell, said electrochemical hydrogen compressor cell including a second anode, wherein said second anode is a gas-diffusion electrode, a second cathode, and an ionic conductive membrane in intimate contact with and separating said second anode and said second cathode, said second anode oxidizing hydrogen generated by said first stack and said second cathode evolving hydrogen at a second pressure;
   wherein the first pressure is atmospheric or moderate pressure and the second pressure is greater than the first pressure.

2. The system of claim 1, wherein said electrochemical hydrogen generating cell is an electrolysis cell.

3. The system of claim 2, wherein said electrolysis cell is a water electrolysis cell.

4. The system of claim 1, wherein protons are generated at said first anode and hydrogen gas is generated at said first cathode.

5. The system of claim 1, wherein hydroxide ions and hydrogen gas are generated at said first cathode.

6. The system of claim 1, wherein protons are generated at said first anode and hydroxide ions and hydrogen gas are generated at said first cathode.

7. The system of claim 1, wherein each of said anodes comprises a noble metal.

8. The system of claim 1, wherein each of said cathodes comprises a noble metal.

9. The system of claim 1, wherein said electrochemical hydrogen generating cell further comprises an ionic conductive membrane in intimate contact with and separating said first anode and said first cathode.

10. The system of claim 9, wherein said ionic conductive membrane is a proton-exchange membrane.

11. The system of claim 1, wherein said electrochemical hydrogen generating cell further comprises an alkaline electrolyte.

12. The system of claim 1, wherein said ionic conductive membrane is a proton-exchange membrane.

13. The system of claim 1, wherein said ionic conductive membrane is a solid alkaline membrane.

14. The system of claim 1, wherein said first and second stacks are unitized between a single set of end plates.

15. The system of claim 1, wherein said first stack comprises a first number of electrochemical hydrogen generating cells connected electrically in series and said second stack comprises a second number of electrochemical hydrogen compressor cells connected electrically in series, each of the first and second numbers being greater than one.

16. The system of claim 15, wherein the second number exceeds the first number by at least one.

17. The system of claim 16, further comprising means for regulating hydrogen pressure between said first cathode and said second anode by causing different levels of current to flow through said first and second stacks.

18. The system of claim 16, further comprising a DC power source shunted between said first anode and said first cathode.

19. The system of claim 16, further comprising a resistor shunted between said first anode and said first cathode.

20. The system of claim 16, further comprising a DC power source shunted between said second anode and said second cathode.

21. The system of claim 16, further comprising a resistor shunted between said second anode and said second cathode.

22. The system of claim 15, further comprising means for regulating hydrogen pressure between said first cathode and said second anode by causing different levels of current to flow through said first and second stacks.

23. The system of claim 15, further comprising a DC power source shunted between said first anode and said first cathode.

24. The system of claim 15, further comprising a resistor shunted between said first anode and said first cathode.

25. The system of claim 15, further comprising a DC power source shunted between said second anode and said second cathode.

26. The system of claim 15, further comprising a resistor shunted between said second anode and said second cathode.

27. A method of producing high-pressure hydrogen in a system including a first stack of at least one electrochemical hydrogen generating cell, said electrochemical hydrogen generating cell including a first anode, a first cathode, and a first ionic conductive membrane in intimate contact with and separating said first anode and said first cathode, and a second stack of at least one electrochemical hydrogen compressor cell, said hydrogen compressor cell including a second anode, a second cathode, and a second ionic conductive membrane in intimate contact with and separating said second anode and said second cathode, the method comprising:

(a) applying power to said first stack;

(b) producing protons and electrons at said first anode;

(c) transporting the protons across said first ionic conductive membrane;

(d) reducing the protons with externally transported electrons at said first cathode to produce hydrogen at a first pressure;

(e) feeding the hydrogen produced by said first stack to said second stack;

(f) oxidizing the hydrogen at said second anode to produce protons and electrons;

(g) transporting the protons across said second ionic conductive membrane; and (h) reducing the protons with externally transported electrons at said second cathode to evolve hydrogen at a second pressure;

wherein the first pressure is atmospheric or moderate pressure and the second pressure is greater than the first pressure.

28. The method of claim 27, further comprising repeating steps (b) through (d) for each electrochemical hydrogen generating cell in said first stack.

29. The method of claim 27, further comprising repeating steps (f) through (h) for each electrochemical hydrogen compressor cell in said second stack.

* * * * *